United States Patent
Liu et al.

(10) Patent No.: US 12,316,203 B2
(45) Date of Patent: May 27, 2025

(54) AXIAL FLUX MOTOR ASSEMBLIES WITH INTEGRATED POWER ELECTRONICS AND DOUBLE-SIDED COOLING

(71) Applicant: GM GLOBAL TECHNOLOGY OPERATIONS LLC, Detroit, MI (US)

(72) Inventors: Ming Liu, Shanghai (CN); Jian Yao, Shanghai (CN); Chengwu Duan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 420 days.

(21) Appl. No.: 17/851,234

(22) Filed: Jun. 28, 2022

(65) Prior Publication Data
US 2023/0396130 A1 Dec. 7, 2023

(30) Foreign Application Priority Data
Jun. 7, 2022 (CN) .......................... 202210634864.3

(51) Int. Cl.
| | |
|---|---|
| H02K 9/19 | (2006.01) |
| H02K 1/18 | (2006.01) |
| H02K 7/14 | (2006.01) |
| H02K 11/33 | (2016.01) |

(52) U.S. Cl.
CPC ............. *H02K 9/19* (2013.01); *H02K 1/182* (2013.01); *H02K 7/14* (2013.01); *H02K 11/33* (2016.01)

(58) Field of Classification Search
CPC .... H02K 1/182; H02K 1/2793; H02K 1/2795; H02K 1/2796; H02K 16/04; H02K 1/20; H02K 9/19; H02K 9/193; H02K 9/22; H02K 9/225; H02K 11/30; H02K 11/33; H02K 2203/03; H02K 2211/03

USPC ......... 310/52, 54, 64, 68 R, 68 D, 71.6, 114, 310/156.32, 268

See application file for complete search history.

(56) References Cited

U.S. PATENT DOCUMENTS

| | | | |
|---|---|---|---|
| 9,054,566 B2 * | 6/2015 | Woolmer | H02K 7/14 |
| 10,135,310 B2 * | 11/2018 | Schuler | H02K 15/03 |
| 11,375,642 B2 | 6/2022 | Liu et al. | |
| 2004/0070307 A1 * | 4/2004 | Haugan | H02K 21/24 |
| | | | 310/268 |

(Continued)

FOREIGN PATENT DOCUMENTS

| | | |
|---|---|---|
| CN | 210898808 U | 6/2020 |
| CN | 112491197 B | 4/2022 |

(Continued)

OTHER PUBLICATIONS

Office Action dated Feb. 10, 2023 from German Patent Office for German Patent Application No. 102022118223.1; 5 pages.

*Primary Examiner* — Jeremy A Luks

(57) ABSTRACT

An axial flux motor assembly is disclosed and includes: an axial flux motor comprising a rotor, and a first stator; and a power inverter assembly. The power module assembly includes: a printed circuit board; a control module mounted on the printed circuit board; power module assemblies connected to the printed circuit board and controlled by the control module; and a cold plate. The cold plate is disposed between the first stator and the power module assemblies and includes a first side and a second side, which is opposite the first side. The cold plate cools the power module assemblies via the first side and the first stator via the second side.

20 Claims, 10 Drawing Sheets

(56) References Cited

U.S. PATENT DOCUMENTS

| | | | | |
|---|---|---|---|---|
| 2014/0247560 A1* | 9/2014 | Lemberg | ................ | H02K 11/33 |
| | | | | 361/705 |
| 2015/0084446 A1* | 3/2015 | Atar | .................... | H02K 11/215 |
| | | | | 310/43 |
| 2017/0155291 A1* | 6/2017 | Deàk | ...................... | H02K 1/182 |
| 2021/0135549 A1* | 5/2021 | Lee | ....................... | H02K 21/24 |
| 2021/0146781 A1* | 5/2021 | Maughan | ............... | H02K 7/116 |

FOREIGN PATENT DOCUMENTS

| | | | |
|---|---|---|---|
| GB | 2468019 A | 8/2010 | |
| WO | WO-2014117881 A1 * | 8/2014 | ........... H02K 1/2786 |
| WO | WO-2021115632 A1 * | 6/2021 | ............. H02K 11/33 |
| WO | WO-2021164945 A1 | 8/2021 | |

\* cited by examiner

AXIAL FLUX MOTOR ASSEMBLIES WITH INTEGRATED POWER ELECTRONICS AND DOUBLE-SIDED COOLING

CROSS-REFERENCE TO RELATED APPLICATIONS

This application claims the benefit of Chinese Patent Application No. 202210634864.3, filed on Jun. 7, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to axial flux motor assemblies.

Electric motors convert electrical energy into mechanical work by the production of torque, while electric generators convert mechanical work to electrical energy. Electric vehicles and hybrid vehicles employ electric motors/generators, such as induction and permanent magnet motors/generators for propulsion and to capture braking energy. Although motors are primarily referred to herein, the principles described herein are also applicable to generators.

An electric motor may include a rotor and a stator. The rotor includes permanent magnets and rotates relative to the stator. The rotor is separated from the stator by an air gap. The stator includes conductors in the form of wire windings. When electrical current is passed through the wire windings, a magnetic field is generated having an associated magnetic flux. Power is transferred over the air gap as a result of the magnetic field acting on the permanent magnets of the rotor. As a result, electrical energy is converted to mechanical energy to rotate the rotor. In an electric vehicle, the rotor may be used to transfer torque via a rotating shaft connected to the rotor through a gear set to drive wheels of the vehicle.

Two types of electric motors are radial flux motors and axial flux motors. In a radial flux motor, the rotor and stator are typically situated in a concentric or nested configuration, such that when the stator is energized, a magnetic flux is created that extends radially from the stator to the rotor. Conductive windings of the stator are typically arranged parallel to an axis of rotation such that a magnetic field is generated, which is oriented in a radial direction from the axis of rotation along the rotor shaft. In an axial flux motor, a magnetic field parallel to an axis of rotation is produced by the electrically conductive wire windings of the corresponding stator. Magnetic flux created in the axial flux motor extends parallel to an axis of rotation of the rotor shaft. Axial flux motors tend to be smaller, lighter, and generate more power than radial flux motors.

SUMMARY

An axial flux motor assembly is disclosed and includes: an axial flux motor comprising a rotor, and a first stator; and a power inverter assembly. The power module assembly includes: a printed circuit board; a control module mounted on the printed circuit board; power module assemblies connected to the printed circuit board and controlled by the control module; and a cold plate. The cold plate is disposed between the first stator and the power module assemblies and includes a first side and a second side, which is opposite the first side. The cold plate cools the power module assemblies via the first side and the first stator via the second side.

In other features, the axial flux motor assembly further includes a second stator. The rotor is disposed between the first stator and the second stator.

In other features, the axial flux motor assembly further includes a second cold plate cooling the second stator, where the first stator and the second stator are disposed between the first cold plate and the second cold plate.

In other features, the power module assemblies include power modules that collectively provide an inverter, which converts a direct current voltage to an alternating voltage to power the axial flux motor.

In other features, the power inverter assembly is attached to an axial end of the axial flux motor.

In other features, at least one of the power module assemblies includes: a baseplate connected to the cold plate and including pin fins cooled by a coolant circulating through the cold plate; at least one of a heat pipe or a vapor chamber; and a power module disposed between the baseplate and the at least one of the heat pipe or the vapor chamber.

In other features, the at least one of the heat pipe or the vapor chamber comprises a first portion, a second portion and a transition region between the first portion and the second portion. The first portion is in contact with the power module. The second portion is in contact with the baseplate. The transition region is bent to provide a gap between the first portion and the baseplate in which the power module is disposed.

In other features, the power module includes: a first substrate in contact with the at least one of the heat pipe and the vapor chamber; a second substrate in contact with the baseplate; and an encapsulated body disposed between the first substrate and the second substrate.

In other features, the baseplate is connected to the cold plate. The pin fins extend into a cavity of the cold plate.

In other features, the power module assemblies include respectively power modules. Each of the power modules includes bus bar connectors for connecting to (i) a same set of direct current bus bars, and (ii) respective phases of the first stator.

In other features, the power module assemblies include respectively power modules. The power modules include pins configured to be connected to the printed circuit board.

In other features, a drive system is disclosed and includes: the axial flux motor assembly; a pump connected to the cold plate via coolant lines; and a second control module configured to control the pump to circulate coolant to and from the cold plate.

In other features, a power module assembly for an axial flux motor assembly is disclosed. The power module assembly includes: at least one of a heat pipe or a vapor chamber; a baseplate configured to be mounted on a cold plate of the axial flux motor assembly and comprising a plurality of pin fins cooled by a coolant circulating through the cold plate and across the plurality of pin fins; and a first power module disposed between the baseplate and the at least one of the heat pipe or the vapor chamber and cooled by (i) the baseplate and (ii) the at least one of the heat pipe or the vapor chamber.

In other features, the pin fins are arranged to extend within an opening in the cold plate.

In other features, the at least one of the heat pipe or the vapor chamber comprises a first portion, a second portion and a transition region between the first portion and the second portion. The first portion is in contact with the first power module. The second portion is in contact with the baseplate. The transition region is bent to provide a gap between the first portion and the baseplate in which the first power module is disposed.

In other features, the first power module includes switch-diode pairs providing a half-bridge of an inverter.

In other features, an axial flux motor assembly is disclosed and includes: a rotor; a stator; the power module assembly; and the cold plate including an opening, which is configured to receive the pin fins. The baseplate is configured to be mounted on the cold plate. The cold plate is disposed between and cools the baseplate and the stator.

In other features, the axial flux motor assembly further includes additional power module assemblies mounted on the cold plate. The additional power module assemblies comprising respective power modules. The first power module and each of the power modules of the additional power module assemblies comprises bus bar connectors for connecting to (i) a same set of direct current bus bars, and (ii) respective phases of the stator.

In other features, the power module assembly includes a first control module configured to control states of switches of the first power module.

In other features, a drive system is disclosed and includes: the axial flux motor assembly; a pump connected to the cold plate via coolant lines; and a second control module configured to control the pump to circulate the coolant to and from the cold plate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
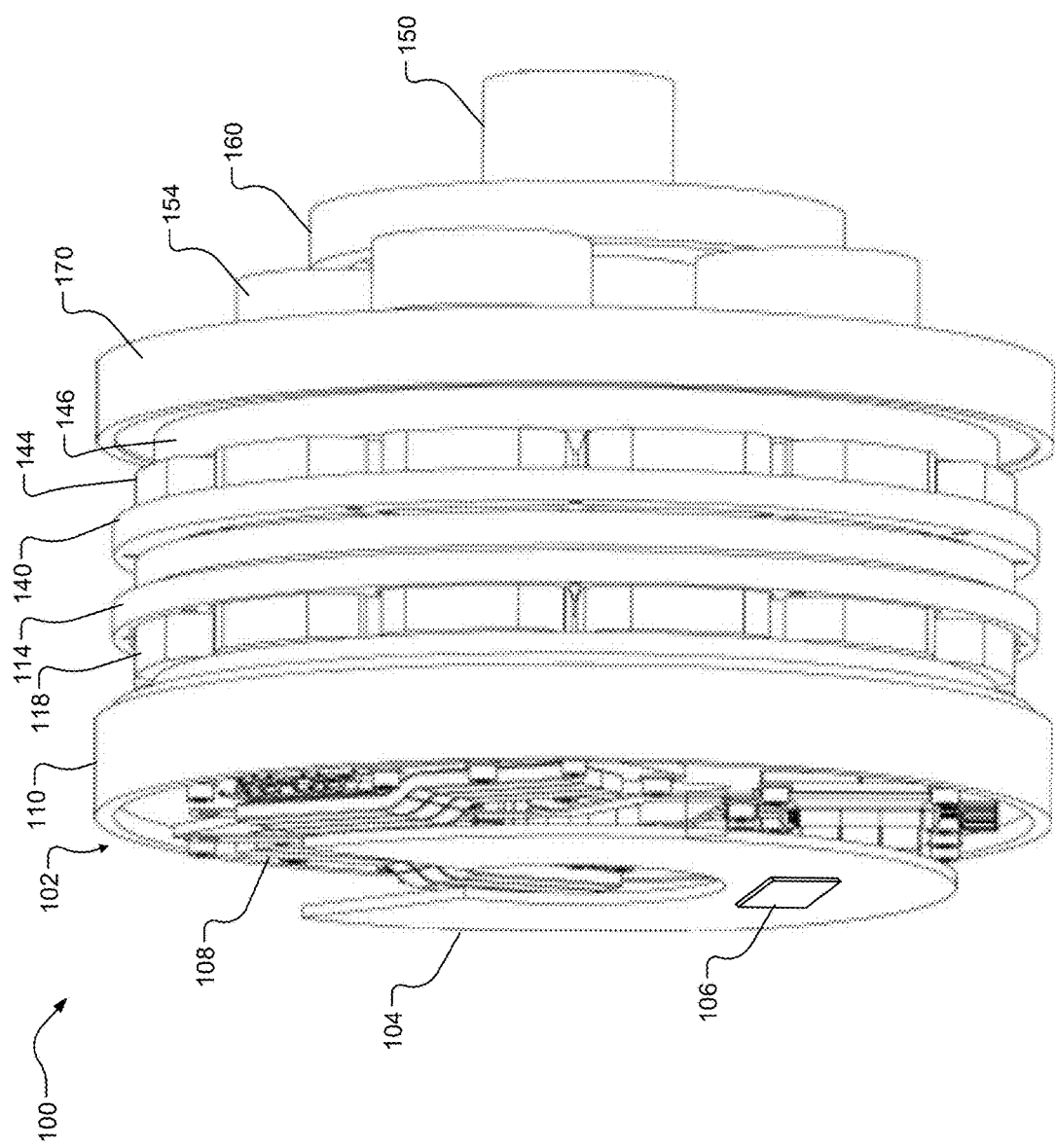
FIG. 1 a side perspective view of a portion of an example of an electric traction drive system including a power inverter assembly including double-sided cooling in accordance with the present disclosure.

Traditional electric drive systems include radial flux motors, referred to herein as radial drive systems. Radial drive systems are generally easy to design, implement and manufacture, but require cooling systems separate from the radial flux motors and are limited in power density. In addition, power electronics including inverter circuitry for the radial drive system are typically included in an electronics box separate from the radial flux motor. The power electronics can require a different amount of cooling than the radial flux motor and thus different cooling circuits can be used to cool the power electronics and the radial flux motors. It can be difficult to achieve high power density with a radial drive system. Power density refers to the amount of output power per unit of volume of the drive system. Radial drive systems typically exhibit a low level of output power for the corresponding overall volume of the radial drive system.

An electric drive system that includes an axial flux motor is referred to herein as an axial drive system. Power electronics including inverter circuitry for an axial drive system is generally easy to design, but can require a cooling system separate from the power electronics and the axial flux motor. The power electronics can be included in an electronics box separate from the radial flux motor. The separate arrangement of the power electronics and cooling system increases volume and decreases power density of the axial drive system.

The examples set forth herein include electric traction drive systems including axial flux motors with integrated power inverter assemblies having double-sided cooling. Double-sided cooling refers to (i) cooling provided on two sides of each power module of the power inverter assemblies, and (ii) cooling provided by two sides of each cold plate. The cold plates are disposed (i) between power module assemblies and stators, and (ii) between stators and gearboxes. For each electric traction drive system, the power electronics is arranged at an axial end of the corresponding axial flux motor and within a same housing as the axial flux motor.

The examples allow the same cooling system to be shared by power electronics of an electric traction drive system while providing high power density due to a compact layout of the electric traction drive system. Double-sided cooling is provided for each power module via a same cooling circuit used to cool other components, such as stator components and gearsets. The examples include connectors configured to connect motor windings of the corresponding axial flux motor to the power modules.

Each of the power modules of the disclosed electric traction drive systems includes half-bridge power electronics and is cooled via (i) a heat pipe or vapor chamber, and (ii) a cold plate that performs as a heat exchanger. This arrangement provides double-sided cooling of the power modules and utilizes the same coolant loop for cooling the power modules and axial flux motors. Each of the cold plates that are attached to the power module cools the power modules on a first side and a stator of an axial flux motor on a second side. An axial end surface of the axial flux motor is cooled without using a complicated cooling jacket. The integrated arrangement of the power electronics and axial flux motors and double-sided cooling increases system integration, increases power density, increases reliability and reduces costs.

Figure 2:
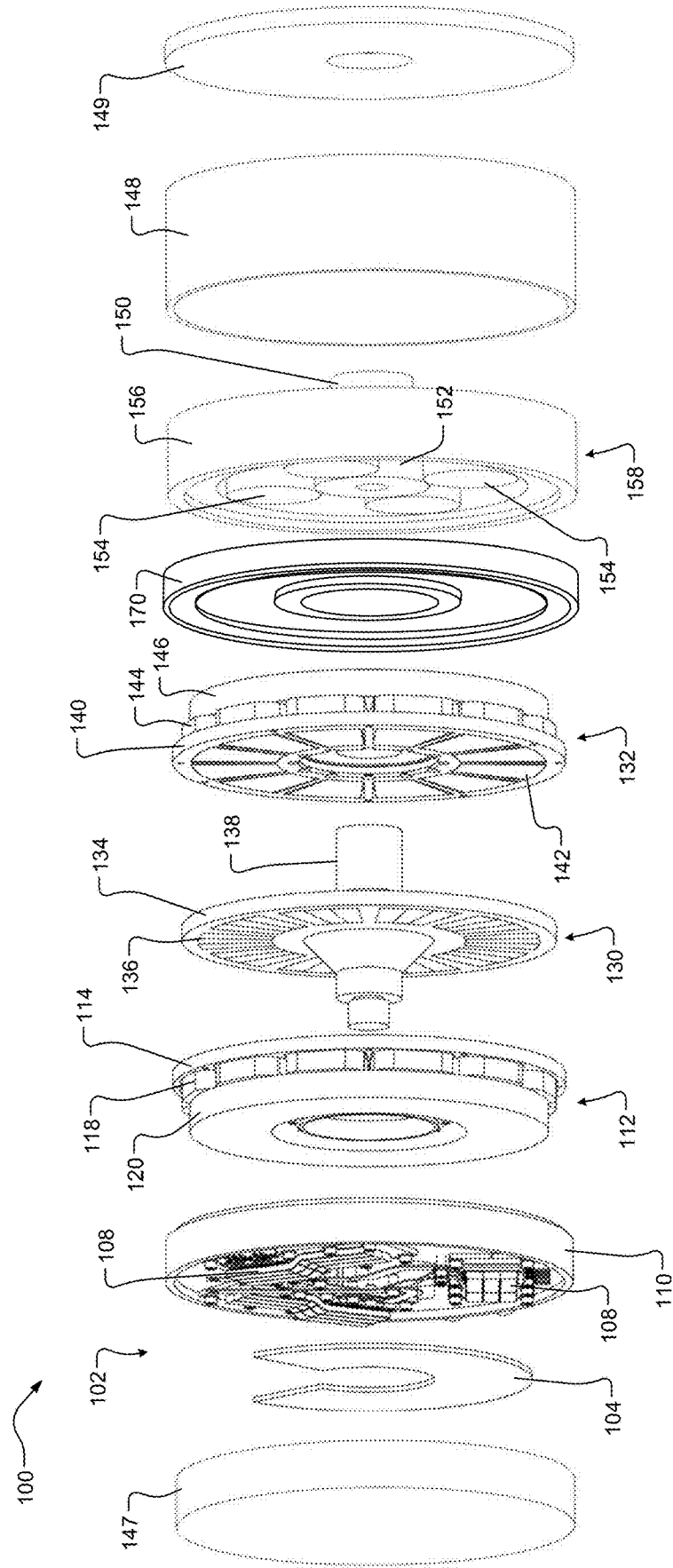
FIG. 2 is an exploded view of the electric traction drive system of FIG. 1.

FIGS. 1-2 shows an electric traction drive system (or axial flux motor assembly) 100 including a power inverter assembly 102 including double-sided cooling. The power inverter assembly 102 is controlled by a printed circuit board (PCB) 104 including electronics, such as a power control module 106 and other circuit components. The PCB 104 is connected to power module assemblies 108, which are mounted on a first side of a first cold plate 110. The first cold plate 110 cools and is disposed between the power module assemblies 108 and a first stator 112. The first stator 112 may include a cage (or frame) 114 that holds stator core segments (not shown) about which electrically conductive windings (or wound conductive wire) 118 are wrapped. An annular body (or ring) 120 is disposed between (i) the stator core segments and the windings 118 and (ii) the first cold plate 110. The annular body 120 may be in contact with a second side of the cold plate 110 opposite the first side.

A rotor 130 is disposed between the first stator 112 and a second stator 132. The rotor 130 includes (i) a frame 134 that holds permanent magnets 136, and (ii) a shaft 138. The second stator 132 is configured similarly as the first stator 112 and includes a cage 140, stator core segments 142, windings 144 and an annular body 146. The first stator 112 may include stator core segments similar to the stator core segments 142. The stator core segments of the stators 112, 132 face the permanent magnets 136 on opposite sides of the rotor 130. The cages 114, 140 may be fixed to an outer housing, such as that shown in FIG. 3, which may be attached to, for example, a vehicle frame and/or other structure. At least portions of the housing are shown in FIG. 2 including a power module cover 147, a gearset cover 148 and an end cover 149.

The rotor 130 rotates and in turn rotates at least one of (i) an output shaft 150 of the electric traction drive system 100, (ii) a sun gear 152, (iii) planetary gears 154, or (iv) a ring gear 156 of a planetary gearset 158. In one embodiment the planetary gearset 158 is not included and the shaft 138 of the rotor 130 is connected to an output shaft 150 of the electric traction drive system 100. In the example shown, the output shaft 150 is connected to a carrier 160 of the planetary gears 154 and thus rotates with the planetary gears. The sun gear 152 may be connected to the shaft 138 of the rotor 130. The ring gear 156 may be fixed to the housing of the electric traction drive system 100. The planetary gearset 158 may be connected up in various different arrangements. Any of the gear 152, 154, 156 may be connected to the shaft 138 or the output shaft 150. The sun gear 152 or the ring gear 156 may be fixed while the other one of the sun gear 152 and the ring gear 156 is free to rotate. The planetary gears 154 are free to rotate relative to the sun gear 152 and the ring gear 156.

A second cold plate 170 may be disposed between the annular body 146 of the second stator 132 and the planetary gearset 158. The second cold plate 170 may cool and be in contact with, for example, the annular body 146 and the ring gear 156. In one embodiment, the second cold plate 170 is not included and the second stator 132 is connected directly to the planetary gearset 158 if the planetary gearset 158 is included.

Each of the stators 112, 132 may include a stator core including stator core segments (referred to herein as "segments") about which electrically conductive windings are wrapped. The stator core segments may be partially or purely formed of a steel alloy. As an example, the segments may be trapezoidal shaped and at least partially be formed of soft magnetic composite (SMC) material and/or a ferromagnetic material.

Segments of each of the stators 112, 132 may be formed of laminated layers of magnetic material that each include a ferromagnetic material, such as magnetic steel. The ferromagnetic material of each of the layers may be isolated from each other by insulative coats. As an example, each of the layers may include a magnetic material layer that is coated with an insulative and/or dielectric material. An insulative material is disposed between two adjacent magnetic material layers. The laminated layers may be laminated steel sheets that are stacked, pressed, punched, annealed, and/or adhered to each other during a manufacturing process to form a laminated stator core tooth. When multiple laminated stator core teeth are assembled, the teeth provide magnetizable poles.

Hybrid segments may be included. The hybrid segments may include both SMC material and laminated magnetic steel stacked layers, referred to as laminated layered blocks. The more laminated content of each segment, the less core loss and the better the operating efficiency of the motor. Stators including hybrid segments may include segments with triangular-shaped cross sections (or triangular-shaped end views). The segments may include laminated stacks that are triangular-shaped as shown and/or segments having other shapes, such as rectangular-shaped segments.

Figure 3:
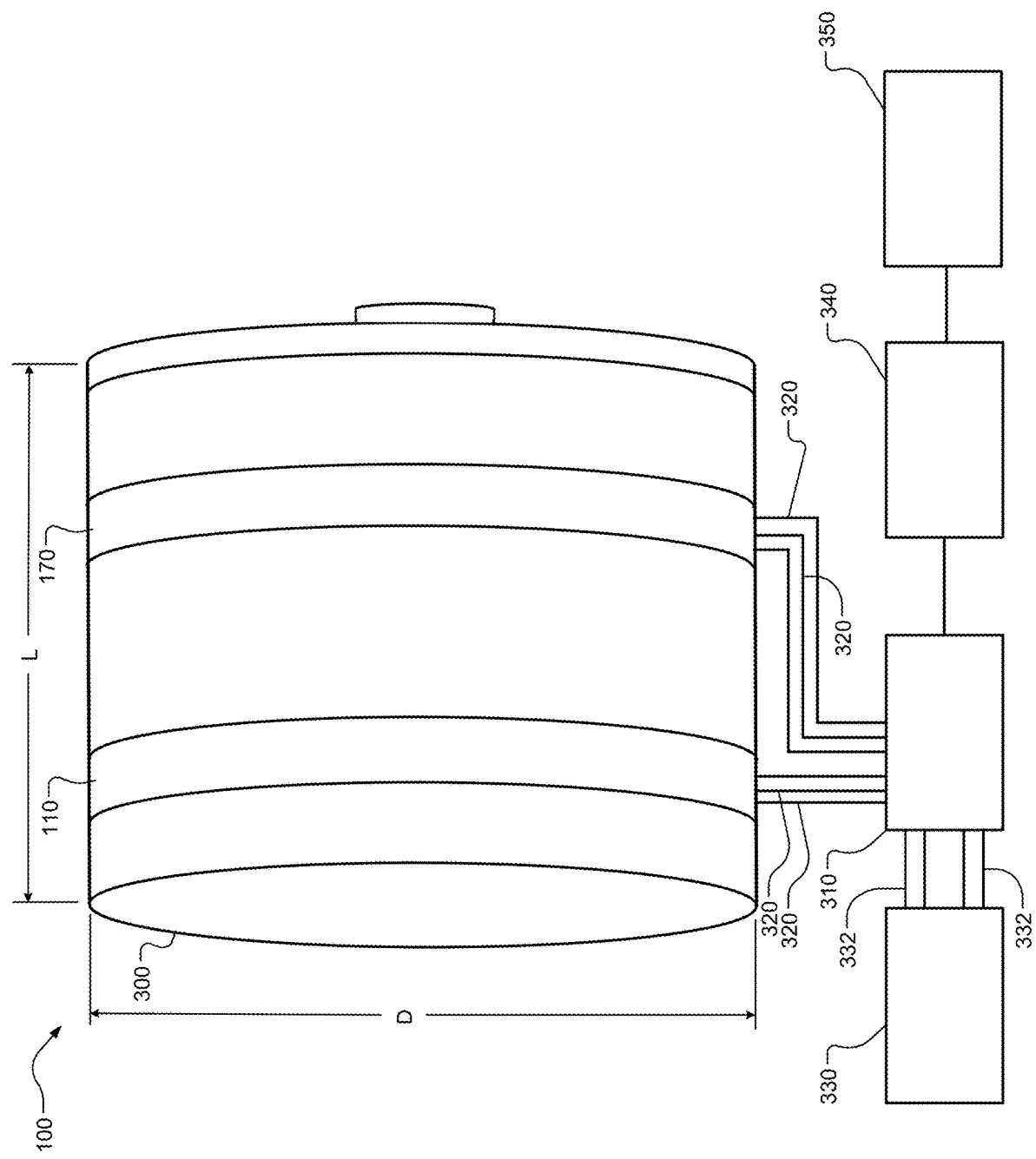
FIG. 3 is a side perspective view of an exterior of the electric traction drive system of FIGS. 1-2.

FIG. 3 shows an exterior view of the electric traction drive system 100 of FIG. 1-2. The electric traction drive system 100 includes a housing 300 including outer peripheral portions of the cold plates 110, 170. The PCB 104, the cold plates 110, 170, the stators 112, 132, the rotor 130, and the planetary gearset 158 of FIG. 2 may be disposed within and/or include portions of the housing 300 of FIG. 3. The cold plates 110, 170 may receive a coolant from a pump 310, which circulates the coolant to and from cavities within the cold plates 110, 170 via coolant lines 320. The pump 310 may receive the coolant from a reservoir 330 and return the coolant to the reservoir 330 via coolant lines 332. A pump control module 340 controls operation of the pump 310. This pump control module 340 may be based on, for example, temperatures of the coolant, the cold plates 110, 170, and/or other components. The temperatures may be determined via temperature sensors 350. The temperature sensors 350 may be connected to the cold plates 110, 170, the coolant lines 320, and/or other parts of the electric traction drive system 100. In one embodiment, each of the cold plates 110, 170 have a respective coolant loop. In another embodiment, the cold plates 110, 170 are connected in series, such that the cold plates 110, 170 are part of a same coolant loop.

As an example, the housing 300 may include an axial length L of 150-200 milli-meters (mm) and a diameter D of 150-300 mm. In one embodiment, the axial length L is about 200 mm±5 mm. The output power of the axial flux motor of the electric traction drive system 100 may be 100-300 kilowatts.

Figure 4:
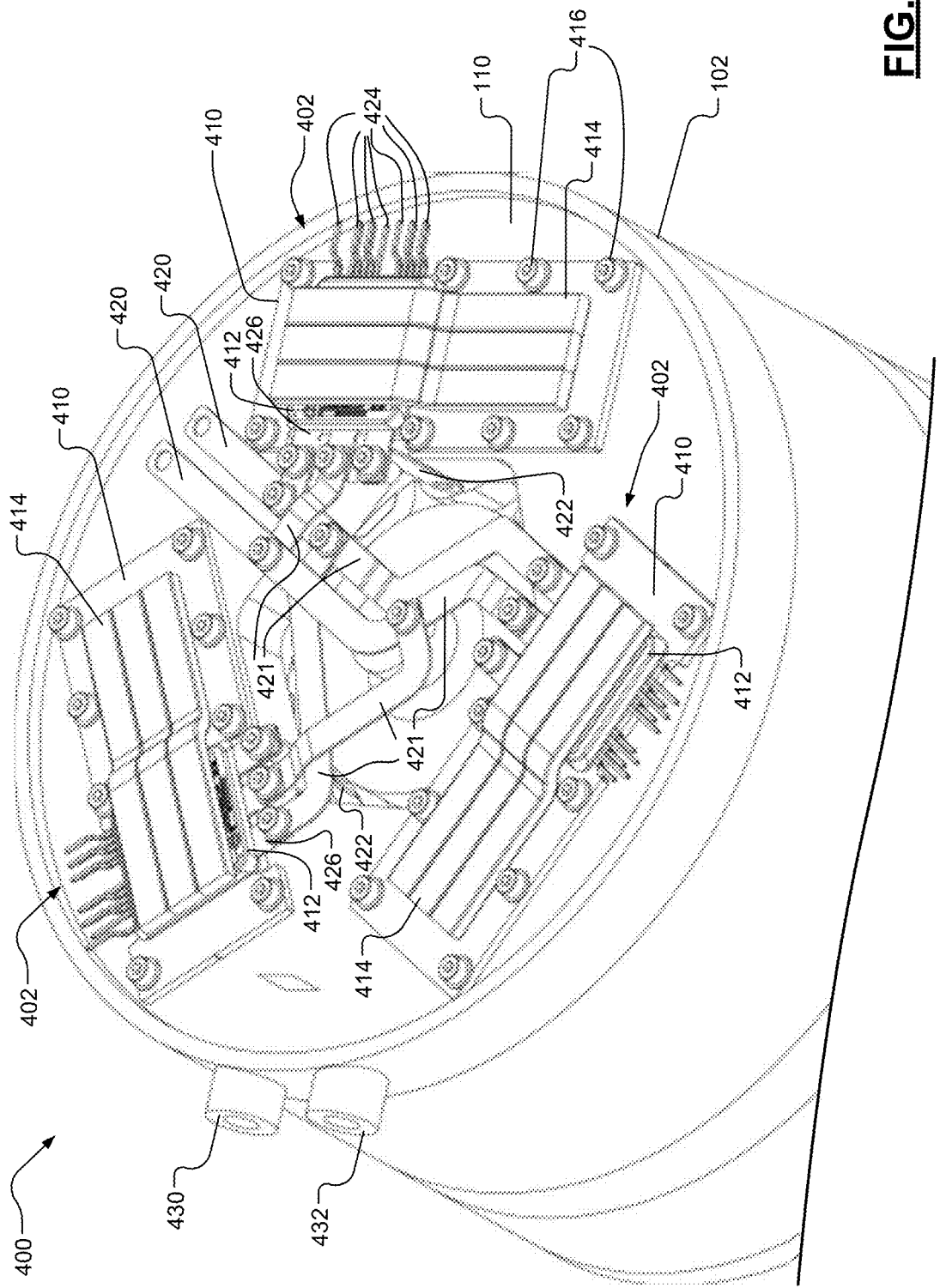
FIG. 4 is a perspective view of another portion of the electric traction drive system illustrating power module assemblies of the power inverter assembly of FIG. 1 in accordance with the present disclosure.
Figure 5:
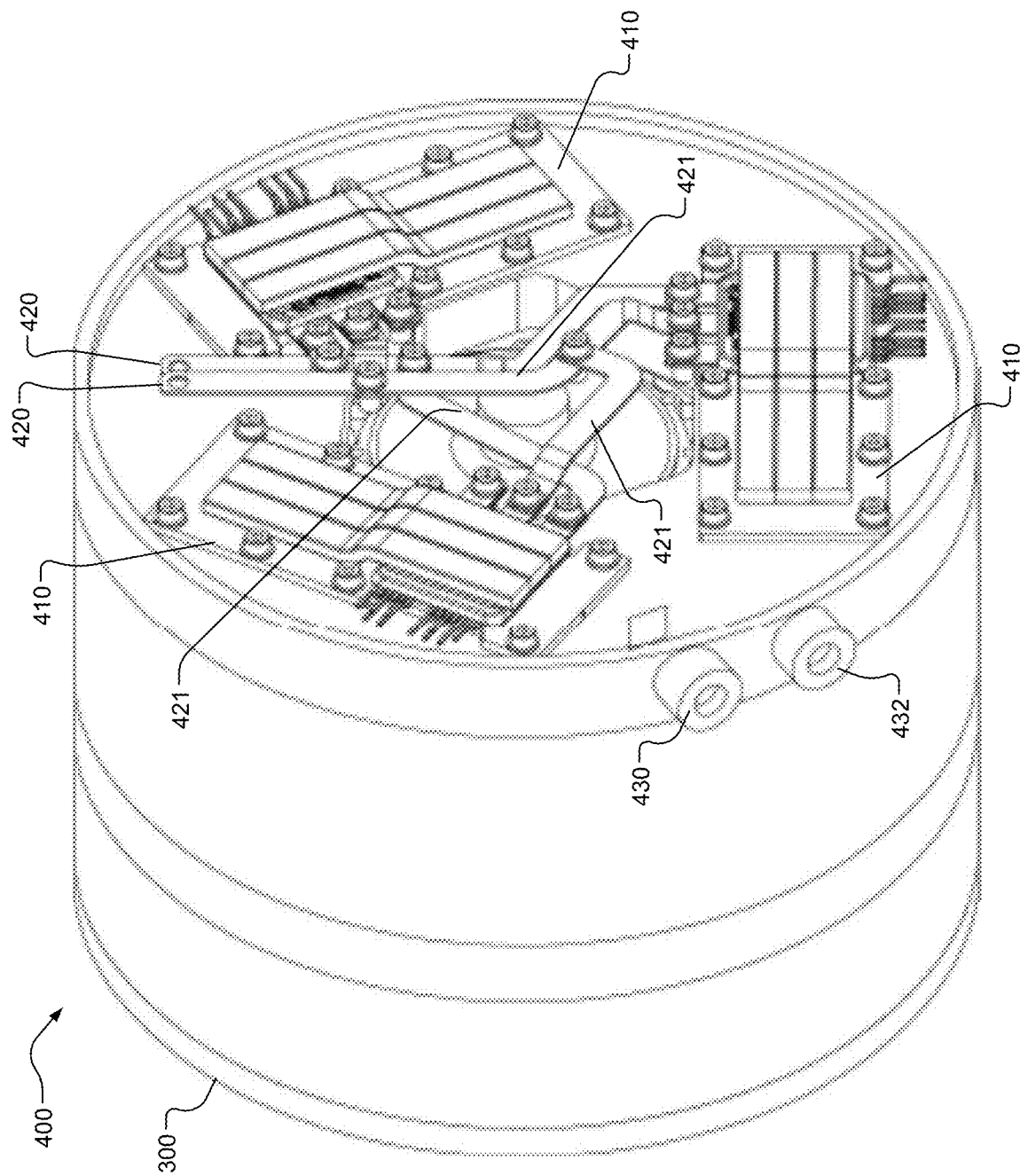
FIG. 5 is another perspective view of the portion of the electric traction drive system shown in FIG. 4 in accordance with the present disclosure.

FIGS. 4-5 show another portion 400 of the electric traction drive system 100 of FIGS. 1-2 including the housing 300 and illustrates power module assemblies 402 of the power inverter assembly 102. Each of the power module assemblies 402 is attached to the cold plate 110 and includes a baseplate 410, a power module 412, and one or more heat pipes (or vapor chambers) 414. The cold plate 110 may have a coolant inlet 430 and a coolant outlet 432, which may be attached to a couple of the coolant lines 320 of FIG. 3. Although the power module assemblies 402 are each shown including three heat pipes 414, each of the power module assemblies 402 may include one or more heat pipes. The baseplates 410 may be attached to the cold plate 110 via fasteners 416 (e.g., bolts). The power modules 412 are disposed between portions of the heat pipes 414 and the baseplates 410.

Each of the power modules 412 is connected to a pair of bus bars 420 receiving a direct current (DC) voltage via a connector 421. Each of the power modules 412 includes a half-bridge circuit including two serially connected switch diode pairs. The power modules 412 collectively operate as an inverter that converts the DC voltage to an alternating current (AC) voltage, which is supplied to phases of the axial flux motor via phase connectors 422. The power modules include pins 424 that connect to the PCB 104 of FIGS. 1-2. The power control module 106 controls the switching frequency and duty cycle of the switches of the power modules 412. Each of the power modules 412 may be connected to a respective phase of the axial flux motor. The phase connectors 422 may be connected to coils of the phases of the axial flux motor. The phase connectors 422 extend axially from the power modules 412 into a radially inner area of the stator 112 to connect to windings of the phases, respectively. Each phase of the three-phase axial flux motor may, for example, include 4 coils of a 12-coil stator. The 4 coils of each of the phases may be connected serially and/or in parallel.

Each of the power modules 412 may include two serially connected switch diode pairs. The six switch diode pairs collectively form an inverter for converting a DC voltage to an AC voltage, which is supplied to power the axial flux motor. The switches may include insulated gate bipolar transistors (IGBTs) or metal oxide semiconductor field effect transistors (MOSFETs). The power modules 412 include pins 424 for connecting to a PCB, such as the PCB 104 of FIGS. 1-2. The pins may extend laterally and/or axially toward the PCB. The power modules 412 may also include bus bar connectors 426 which are connected to the bus bars 420 and the phase connectors 422.

Figure 6B:
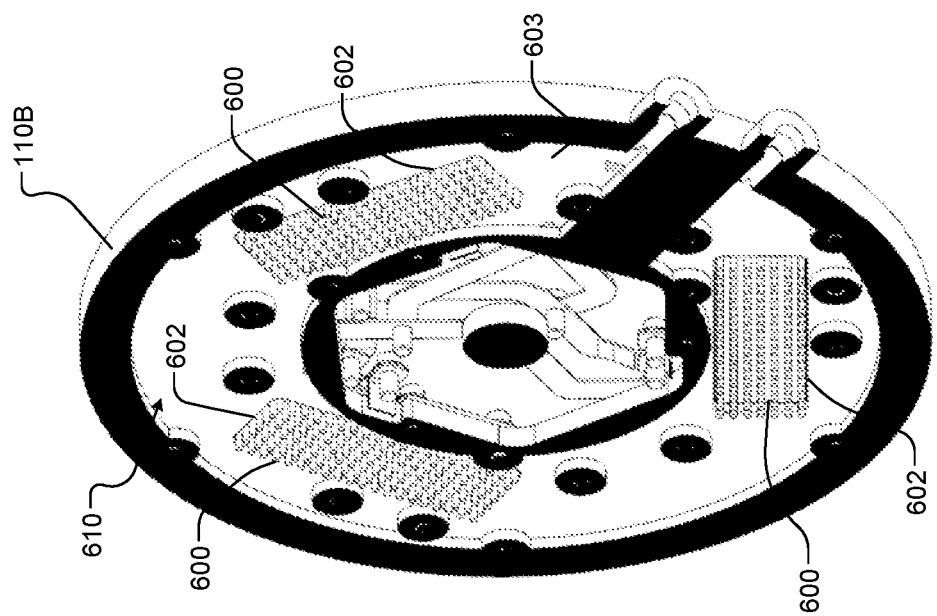
FIG. 6B is a perspective cutaway view of a portion of the electric drive system illustrating a power module side of an interior of the cold plate of the power inverter assembly in accordance with the present disclosure.
Figure 6A:
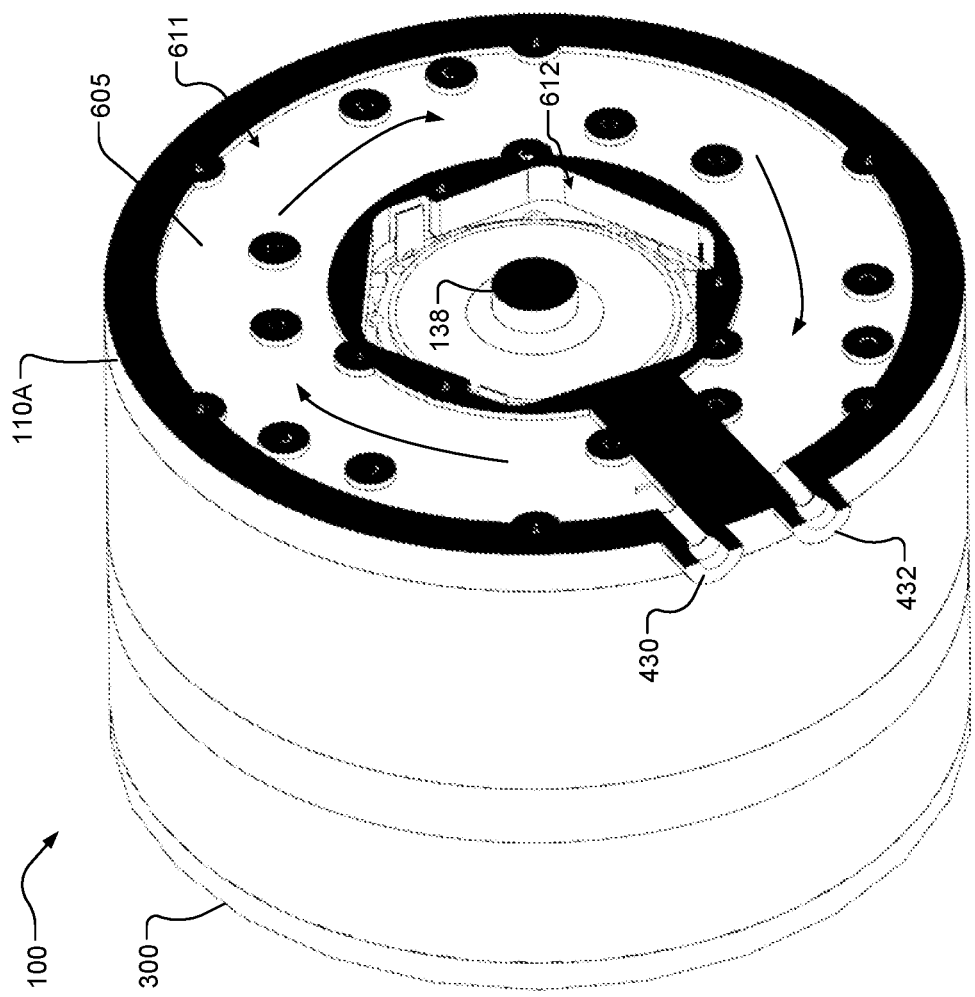
FIG. 6A is a perspective cutaway view of a portion of the electric drive system illustrating a stator side of an interior of a cold plate of the power inverter assembly in accordance with the present disclosure.

FIGS. 6A-6B show an interior of the cold plate 110 of the power inverter assembly 102 of electric traction drive system 100 of FIGS. 1-2. FIG. 6A shows a stator side of an interior of the cold plate 110 (designated 110A). FIG. 6B shows a power module side of an interior of the cold plate 110 (designated 110B). Coolant may flow into the coolant inlet 430, flow clockwise around the interior of the cold plate 110, and out the coolant outlet 432. The coolant may flow across pin fins 600 of the baseplates 410, which are shown in FIGS. 4-5. The pin fins 600 extend from a bottom side of the baseplates 410, through rectangular-shaped opening 602 in a wall 603 of the cold plate 110 and into a cavity within the cold plate 110. The cold plate 110 includes walls 603, 605. The coolant thereby cooling the pin fins 600 and the baseplates 410. The cavity 610 is formed by channels 610, 611 of the walls 603, 605 and surrounds a central cavity 612 in which an end of the shaft 138 of the rotor 130 is located.

Figure 7:
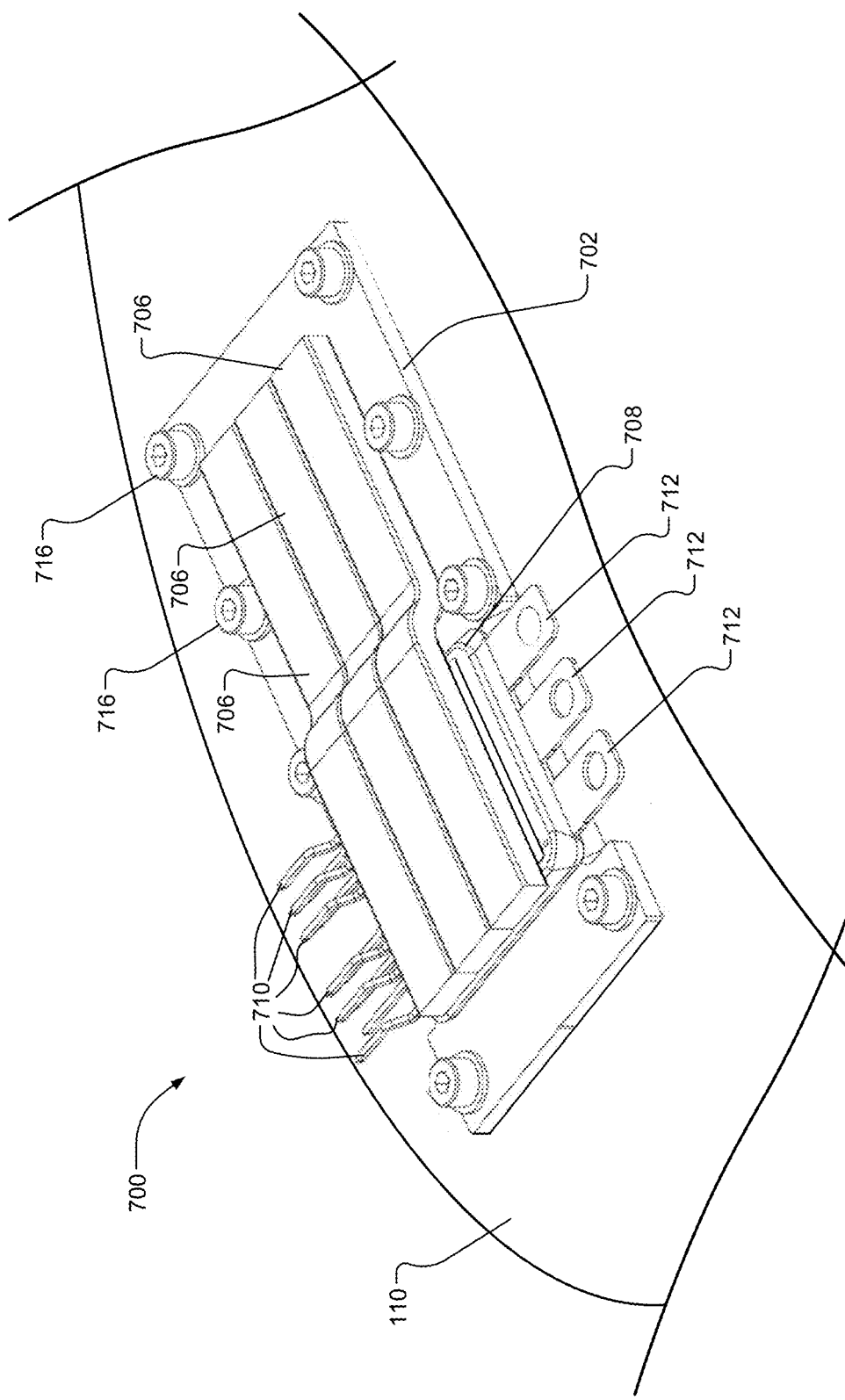
FIG. 7 is a perspective view of an example of a power module assembly in accordance with the present disclosure.
Figure 8:
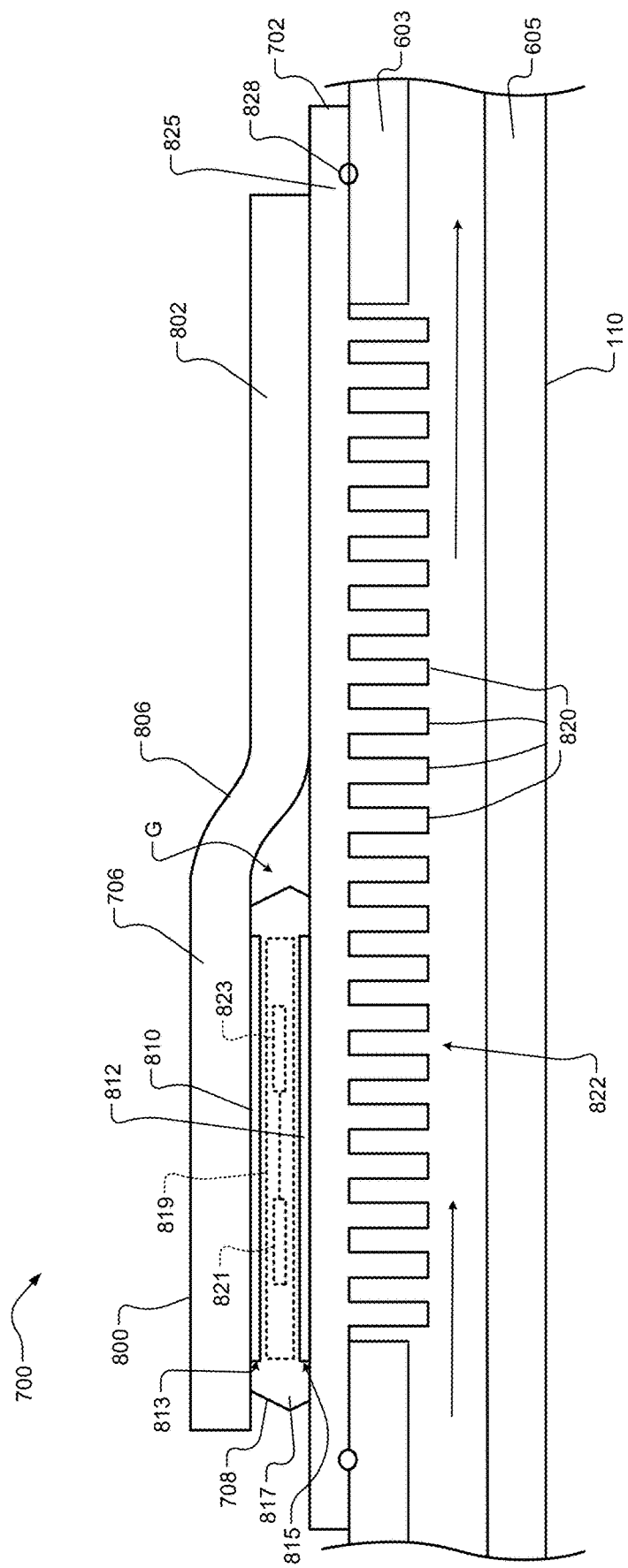
FIG. 8 is side cross-sectional view of the power module assembly of FIG. 7.

FIGS. 7-8 show an example of a power module assembly 700. The power module assembly 700 may be used instead of any of the power modules of FIGS. 4-5 and may be coupled to an outer surface of the cold plate 110 and have a baseplate with pin fins that extend into the cold plate 110. The power module assembly 700 is configured similarly as the power module assemblies 402 of FIGS. 4-5. The power module assembly 700 includes (i) one or more heat pipes (or vapor chambers) 706, (ii) a power module 708, and (iii) the baseplate 702. The power module 708 includes (i) pins 710 for connecting to a PCB, such as the PCB 104 of FIGS. 1-2, and (ii) bus bar connectors 712 for connecting to bus bars and phase connectors. The baseplate 702 is attached via fasteners 716 to the cold plate 110.

Referring to FIG. 8, the power module assembly 700 includes the power module 708 disposed between the heat pipe(s) 706 and the baseplate 702. The heat pipe(s) 706 include a first portion 800 disposed over the power module 708 and a second portion 802 disposed over and attached to the baseplate 702. The heat pipe(s) are curved in a transition region 806 between the portions 800, 802. The first portion 800 may be attached to the power module 708 via soldering, brazing, adhesive, thermal interface materials, or in direct contact with the power module 708. The second portion 802 may be attached to the baseplate 702 via soldering, brazing, adhesive, thermal interface materials, or in direct contact with the baseplate 702. The heat pipe(s) 706 include an inner sealed cavity having a working fluid (e.g., water or alcohol) under vacuum. An outer housing of the heat pipe 706 may be formed of copper and/or other suitable material. If there is a temperature difference and the heated portion of the heat pipe 706 has enough heat, the working fluid in that region evaporates into vapor. The vapor moves to a relative cold portion and condensed into fluid. Such process gives the heat pipe(s) 706 high thermal conductivity and can transfer the heat from one end (or portion) to the other.

Thermal energy is transferred from both sides of the power module 708 to the coolant within the cold plate 110 in two separate paths. In the FIG. 8, the shown left portion of the baseplate 702 absorbs the thermal energy from the bottom side of the power module 708 and transfers the thermal energy to the pin fins 820 underneath the baseplate 702, which are directly cooled by the coolant in cavity 822 of the cold plate 110. The first portion 800 of heat pipe(s) 706 absorb the thermal energy from the top side of the power module 708 and transfer that to the second portion 802 of heat pipe(s) 706. The thermal energy is then transferred to the shown right portion of the baseplate 702. The thermal energy is then transferred to the pin fins 820 underneath the base plate 702, which are directly cooled by coolant in cavity 822.

A first substrate 810 represents an exterior component of the top side of power module 708, which may be disposed or attached to the heat pipe 706. A second substrate 812 represents the exterior component of the bottom side of power module 708, which may be disposed or attached to the baseplate 702. The substrates 810, 812 may be implemented as directed bonded coper (DBC) layers, directed bonded aluminum (DBA) layers, or active metal brazing (AMB) layers and be embedded in recessed areas 813, 815 of an encapsulated body 817. The power module 708 may include an outer epoxy encapsulation layer that encapsulates a circuit 819, which may include two serially connected switch-diode pairs 821, 823. The first substrate 810 may be in direct contact with the first portion 800 and a first surface of the power module 708. The second substrate 812 may be in direct contact with the second portion 802 and a second surface of the power module 708. The baseplate 702 includes pin fins 820 that extend from a base member 825 into a cavity 822 and are cooled by a coolant circulating through the cold plate 110. The pin fins 820 may extend perpendicular to the base member 825.

An O-ring 828 and/or other seal may be disposed between the baseplate 702 and the cold plate 110. The cold plate includes the first wall 603 and the second wall 605. Thermal grease, solder, sintered silver, brazing, and/or other elements may be used between surfaces of the stated components, such as (i) between the heat pipe 706 and the substrate 810 and/or power module 708, (ii) between the substrates 810, 812 and the power module 708, and (iii) between the baseplate 702 and the substrate 812 and/or the power module 708. Although coolant flow is shown in a first direction, the coolant may flow in an opposite direction and/or a different direction than shown.

While a vehicle example is described below, the present application is also applicable to non-vehicle implementations. The present application is applicable to other axial flux motor applications. It will be appreciated that the concepts apply not only to electric axial flux motors that generate mechanical energy from electrical energy, but also to axial flux generators that can generate electrical energy from mechanical energy.

Figure 9:
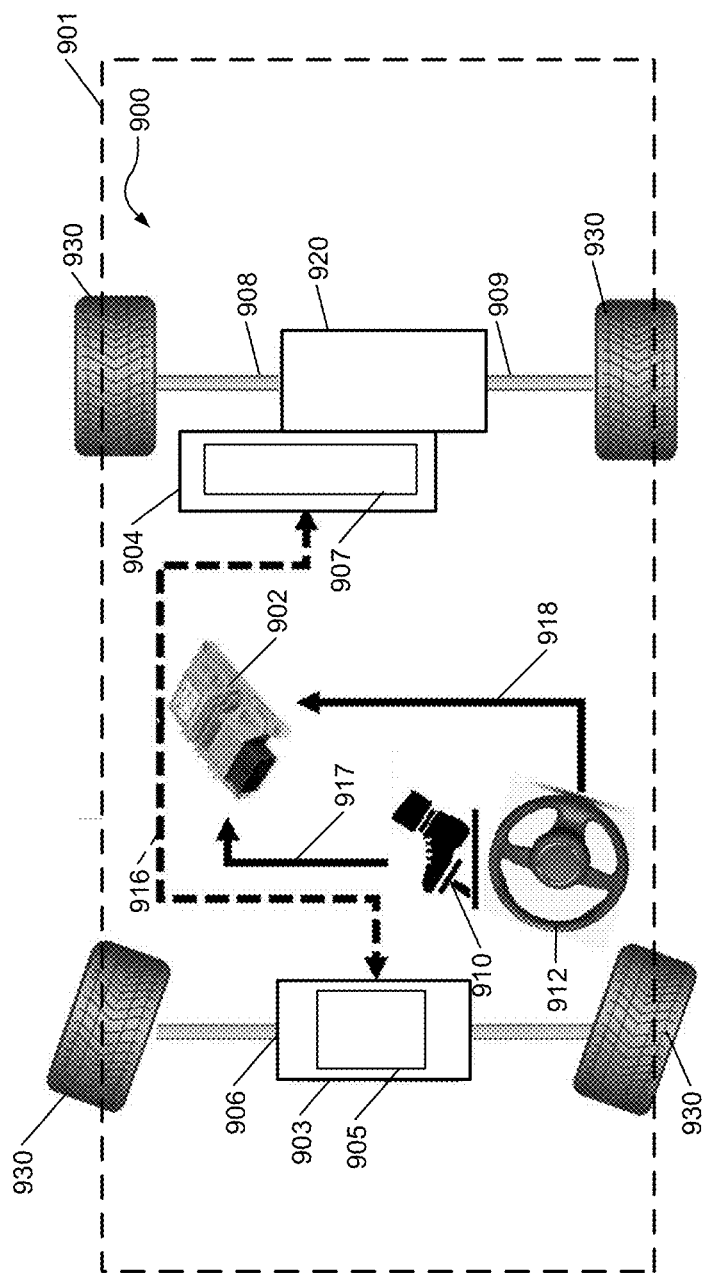
FIG. 9 is a top view of a portion of a vehicle including axial flux motor assemblies in accordance with the present disclosure.

FIG. 9 shows a portion 900 of a vehicle 901 (referred to as a vehicle system) including electric traction drive systems (or axial flux motor assemblies) 903, 904 including respective axial flux motors 905, 907. The vehicle system includes a control module 902, multiple axial flux motor assemblies 903, 904, a front axle 906, rear axles 908, 909, a user input device 910, and a steering device (e.g., steering wheel) 912. The control module 902 controls distribution of output torque to the axles 906, 908, 909 based on torque requests. As an example, the torque requests may be provided by a driver via the user input device 910 (e.g., an accelerator pedal) or via another input device, such as a steering angle (e.g., angle of a steering wheel). Distribution of output torque is represented by dashed line 916 and inputs from the user input device 910 and the steering device 912 are represented by arrows 917, 918. In the example shown, the axial flux motor 907 is connected to the axles 908, 909 via a differential transfer case 920. The axles 906, 908, 909 are connected to drive tires 930.

Figure 10:
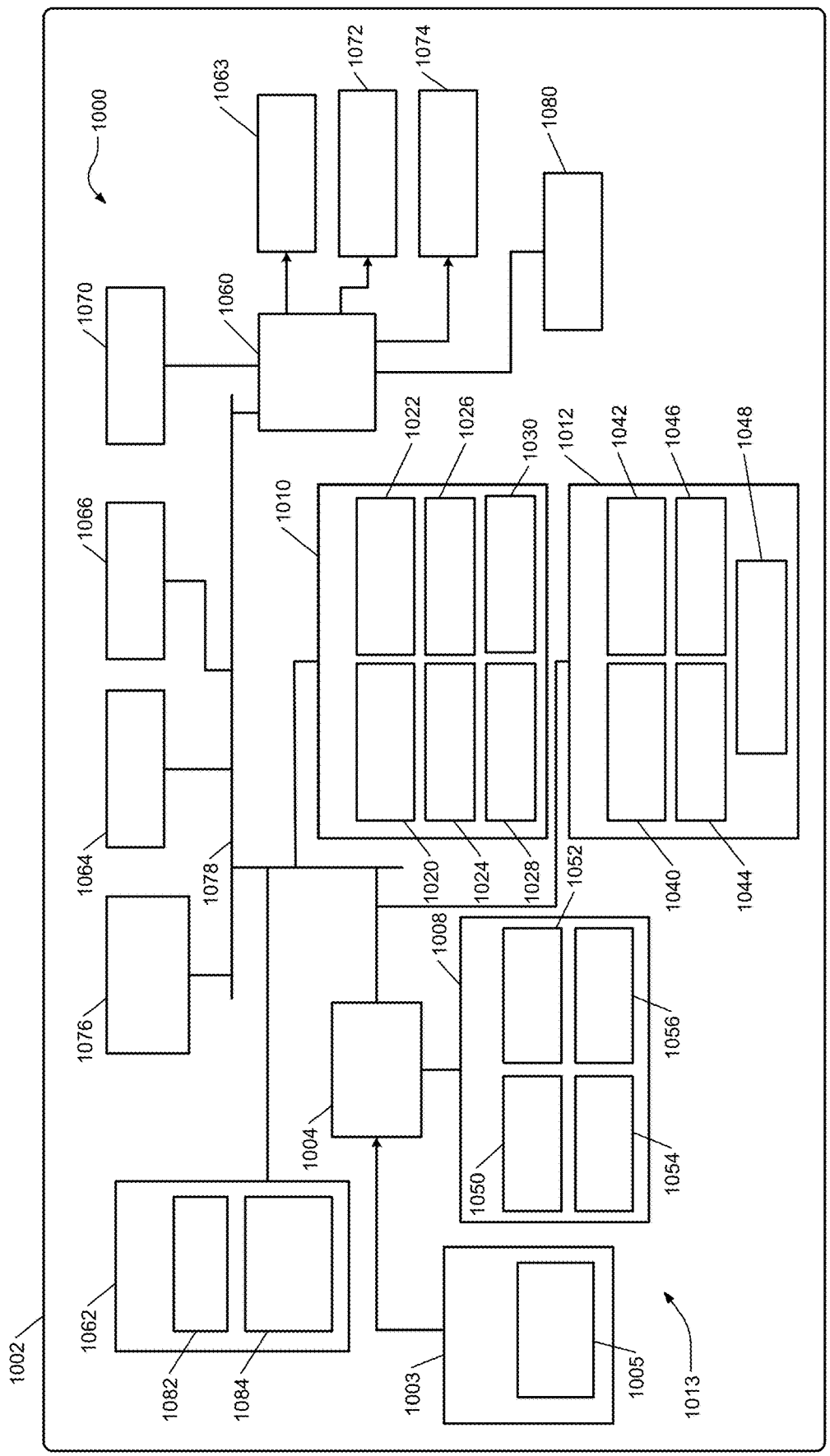
FIG. 10 is a functional block diagram of a vehicle system including axial flux motor assemblies in accordance with the present disclosure.

FIG. 10 shows a vehicle system 1000 of a vehicle 1002 including one or more axial flux motors 1005. The vehicle system 1000 may operate similarly and/or be configured similarly as the vehicle system of FIG. 9. The vehicle system 1000 may include a chassis control module 1004 and torque sources, such as one or more electric traction drive systems 1003 including axial flux motors 1005 and one or more engines (one engine 1008 is shown). The vehicle system 1000 may further include vehicle sensors 1010, and memory 1012. The chassis control module 1004 may control distribution of output torque to axles of the vehicle 1002 via the torque sources. The chassis control module 1004 may control operation of a propulsion system 1013 that includes the axial flux motors 1005 and the engine(s) 1008. The electric traction drive systems 1003 may be implemented as any of the electric traction drive systems disclosed herein.

The sensors 1010 may include a steering sensor 1020 (e.g., a steering wheel sensor), a vehicle speed sensor 1022, accelerometers 1024, an accelerator pedal sensor 1026, a yaw rate sensor 1028 and other sensors 1030. The chassis control module 1004 controls the torque sources based on outputs of the sensors 1010.

The memory 1012 may store vehicle states 1040, tire forces 1042, driver inputs 1044, actuator constraints 1046, and other parameters and data 1048. The vehicle states 1040 may include longitudinal, lateral and vertical forces. The tire forces 1042 may indicate tire capacity levels. Driver inputs 1044 may refer to accelerator pedal positions, steering wheel angles, and/or other driver inputs. The actuator constraints 1046 may include maximum output torques of the torque sources (or how much output torque each torque source is capable of generating). The engine 1008 may include a starter motor 1050, a fuel system 1052, an ignition system 1054 and a throttle system 1056.

The vehicle 1002 may further include a body control module (BCM) 1060, a telematics module 1062, a brake system 1063, a navigation system 1064, an infotainment system 1066, an air-conditioning system 1070, other actuators 1072, other devices 1074, and other vehicle systems and modules 1076. The modules and systems 1004, 1060, 1062, 1064, 1066, 1070, 1076 may communicate with each other via a controller area network (CAN) bus 1078 and/or other suitable communication interface. A power source 1080 may be included and power the BCM 1060 and other systems, modules, devices and/or components. The power source 1080 may include one or more batteries and/or other power sources.

The telematics module 1062 may include transceivers 1082 and a telematics control module 1084. The BCM 1060 may control the modules and systems 1062, 1063, 1064, 1066, 1070, 1076 and other actuators, devices and systems (e.g., the actuators 1072 and the devices 1074). This control may be based on data from the sensors 1010.

The above-described examples provide improved power density of drive units with reduced drive system complexity. The examples include integrated power electronics and axial flux motor with double-sided cooling.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An axial flux motor assembly comprising:
    an axial flux motor comprising
        a rotor, and
        a first stator; and
    a power inverter assembly comprising
        a printed circuit board,
        a control module mounted on the printed circuit board,
        a plurality of power module assemblies connected to the printed circuit board and controlled by the control module, and
        a first cold plate disposed between the first stator and the plurality of power module assemblies and comprising a first side and a second side, which is opposite the first side, the first cold plate cooling the plurality of power module assemblies via the first side and the first stator via the second side,
        wherein at least one of i) the second side of the first cold plate is in direct contact with the first stator, and ii) the first cold plate comprises at least one enclosed cavity to and from which a liquid coolant is circulated.

2. The axial flux motor assembly of claim 1, further comprising a second stator,
    wherein the rotor is disposed between the first stator and the second stator.

3. The axial flux motor assembly of claim 2, further comprising a second cold plate cooling the second stator, wherein the first stator and the second stator are disposed between the first cold plate and the second cold plate.

4. The axial flux motor assembly of claim 1, wherein the plurality of power module assemblies include power modules that collectively provide an inverter, which converts a direct current voltage to an alternating voltage to power the axial flux motor.

5. The axial flux motor assembly of claim 1, wherein the power inverter assembly is attached to an axial end of the axial flux motor.

6. The axial flux motor assembly of claim 1, wherein at least one of the plurality of power module assemblies comprises:
   a baseplate connected to the first cold plate and comprising a plurality of pin fins cooled by a coolant circulating through the first cold plate;
   at least one of a heat pipe or a vapor chamber; and
   a power module disposed between the baseplate and the at least one of the heat pipe or the vapor chamber.

7. The axial flux motor assembly of claim 6, wherein:
   the at least one of the heat pipe or the vapor chamber comprises a first portion, a second portion and a transition region between the first portion and the second portion;
   the first portion is in contact with the power module;
   the second portion is in contact with the baseplate; and
   the transition region is bent to provide a gap between the first portion and the baseplate in which the power module is disposed.

8. The axial flux motor assembly of claim 6, wherein the power module comprises:
   a first substrate in contact with the at least one of the heat pipe and the vapor chamber;
   a second substrate in contact with the baseplate; and
   an encapsulated body disposed between the first substrate and the second substrate.

9. The axial flux motor assembly of claim 6, wherein:
   the baseplate is connected to the first cold plate; and
   the plurality of pin fins extend into a cavity of the first cold plate.

10. The axial flux motor assembly of claim 1, wherein:
    the plurality of power module assemblies comprise respectively a plurality of power modules; and
    the plurality of power modules comprise a plurality of pins configured to be connected to the printed circuit board.

11. A drive system comprising:
    the axial flux motor assembly of claim 1;
    a pump connected to the first cold plate via coolant lines; and
    a second control module configured to control the pump to circulate coolant to and from the first cold plate.

12. An axial flux motor assembly comprising:
    an axial flux motor comprising
      a rotor, and
      a first stator; and
    a power inverter assembly comprising
      a printed circuit board,
      a control module mounted on the printed circuit board,
      a plurality of power module assemblies connected to the printed circuit board and controlled by the control module, and
      a cold plate disposed between the first stator and the plurality of power module assemblies and comprising a first side and a second side, which is opposite the first side, the cold plate cooling the plurality of power module assemblies via the first side and the first stator via the second side,
    wherein
      the plurality of power module assemblies comprise respectively a plurality of power modules, and
      each of the plurality of power modules comprises bus bar connectors for connecting to (i) a same set of direct current bus bars, and (ii) respective phases of the first stator.

13. A power module assembly for an axial flux motor assembly, the power module assembly comprising:
    at least one of a heat pipe or a vapor chamber;
    a baseplate configured to be mounted on a cold plate of the axial flux motor assembly and comprising a plurality of pin fins cooled by a coolant circulating through the cold plate and across the plurality of pin fins; and
    a first power module disposed between the baseplate and the at least one of the heat pipe or the vapor chamber and cooled by (i) the baseplate and (ii) the at least one of the heat pipe or the vapor chamber.

14. The power module assembly of claim 13, wherein the plurality of pin fins are arranged to extend within an opening in the cold plate.

15. The power module assembly of claim 13, wherein:
    the at least one of the heat pipe or the vapor chamber comprises a first portion, a second portion and a transition region between the first portion and the second portion;
    the first portion is in contact with the first power module;
    the second portion is in contact with the baseplate; and
    the transition region is bent to provide a gap between the first portion and the baseplate in which the first power module is disposed.

16. The power module assembly of claim 13, wherein the first power module comprises a plurality of switch-diode pairs providing a half-bridge of an inverter.

17. An axial flux motor assembly comprising:
    a rotor;
    a stator;
    the power module assembly of claim 13; and
    the cold plate comprising an opening, which is configured to receive the plurality of pin fins,
    wherein
      the baseplate is configured to be mounted on the cold plate, and
      the cold plate is disposed between and cools the baseplate and the stator.

18. The axial flux motor assembly of claim 17, further comprising additional power module assemblies mounted on the cold plate, wherein:
    the additional power module assemblies comprising respective power modules; and
    the first power module and each of the power modules of the additional power module assemblies comprises bus bar connectors for connecting to (i) a same set of direct current bus bars, and (ii) respective phases of the stator.

19. The axial flux motor assembly of claim 17, wherein the power module assembly comprises a first control module configured to control states of switches of the first power module.

20. A drive system comprising:
    the axial flux motor assembly of claim 19;
    a pump connected to the cold plate via coolant lines; and
    a second control module configured to control the pump to circulate the coolant to and from the cold plate.

* * * * *